Figure 9:
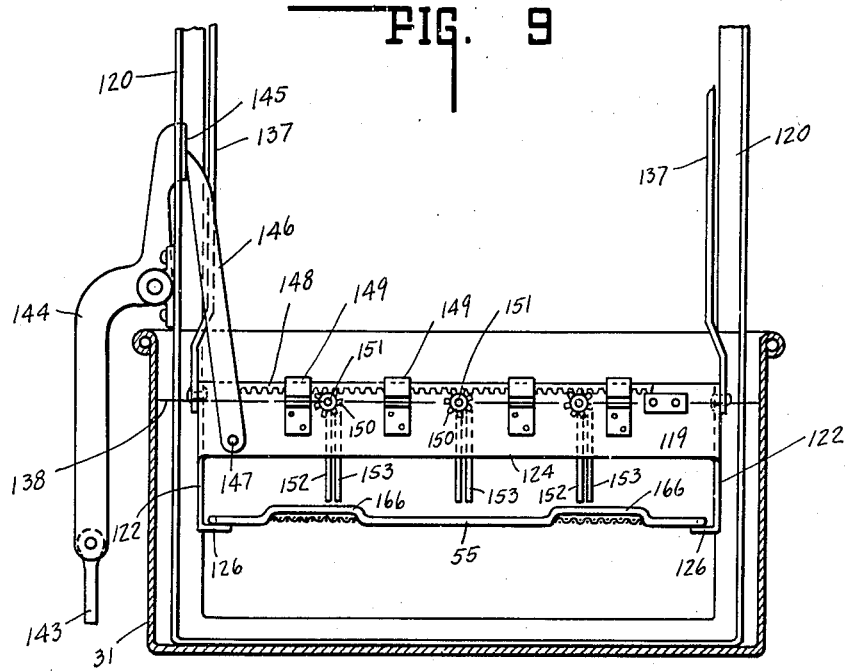

Nov. 16, 1943.                J. T. RUCH                    2,334,650
                    APPARATUS FOR DEEP FAT COOKING
                       Filed May 5, 1941           6 Sheets-Sheet 1
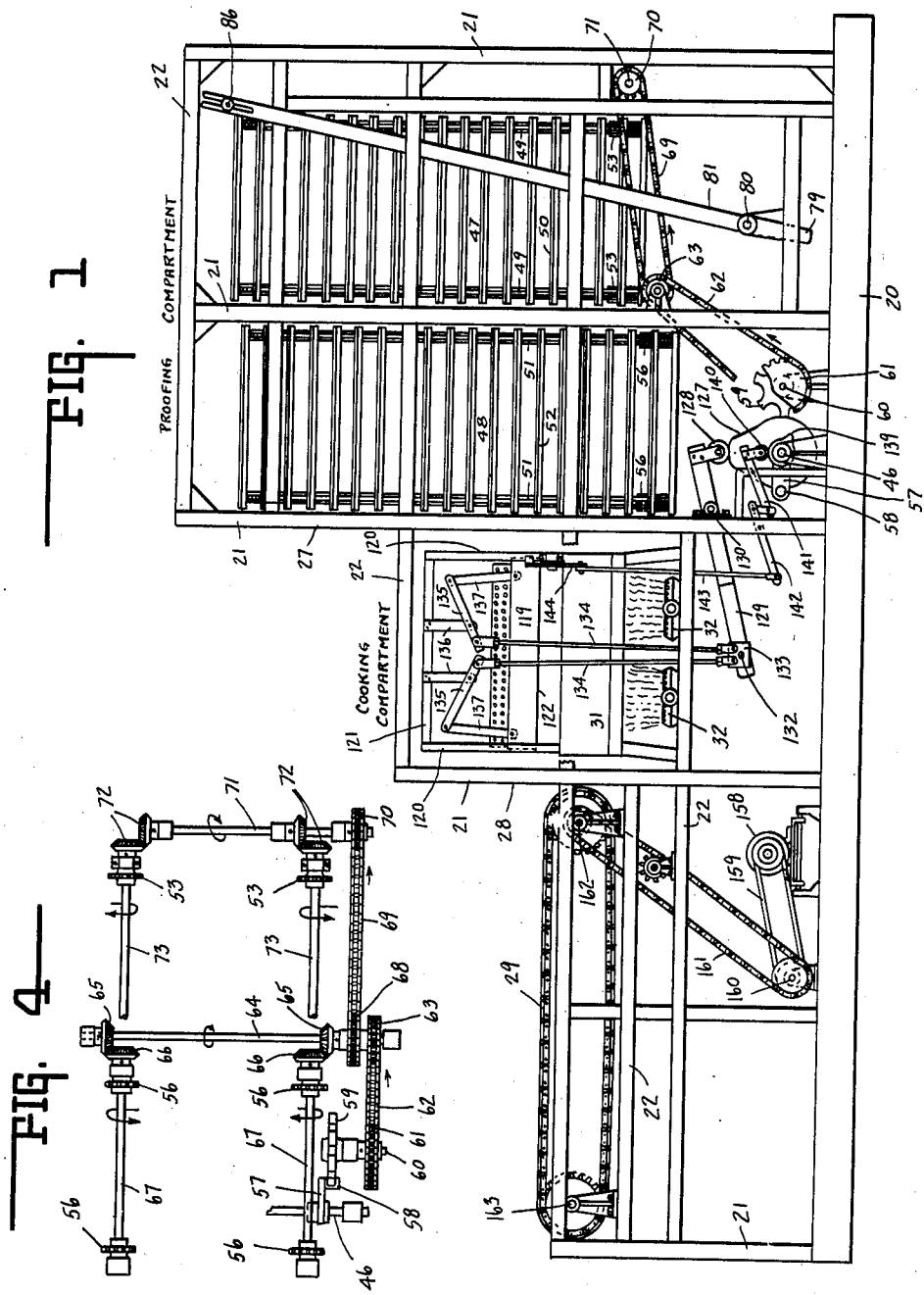
INVENTOR.
JULIUS T. RUCH.
BY Lockwood, Goldsmith & Galt
ATTORNEYS.

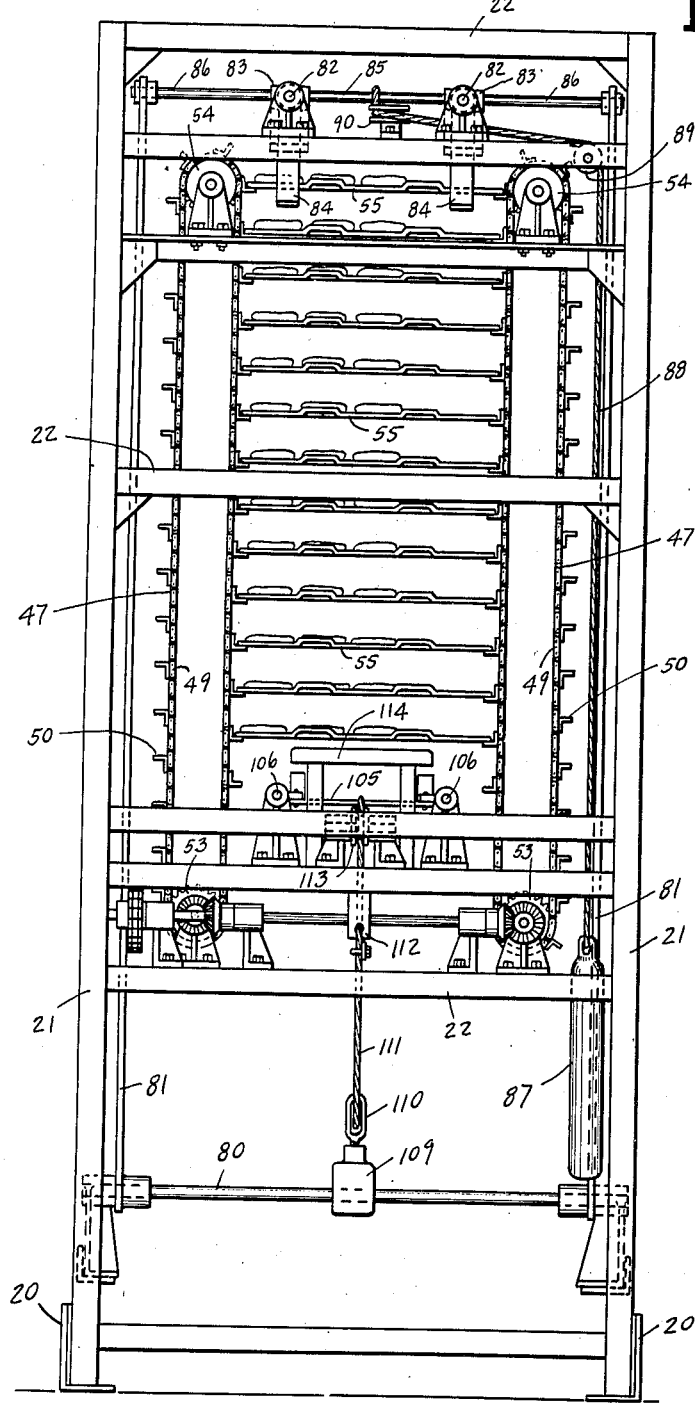

Nov. 16, 1943.                J. T. RUCH                2,334,650
                    APPARATUS FOR DEEP FAT COOKING
                        Filed May 5, 1941         6 Sheets-Sheet 3
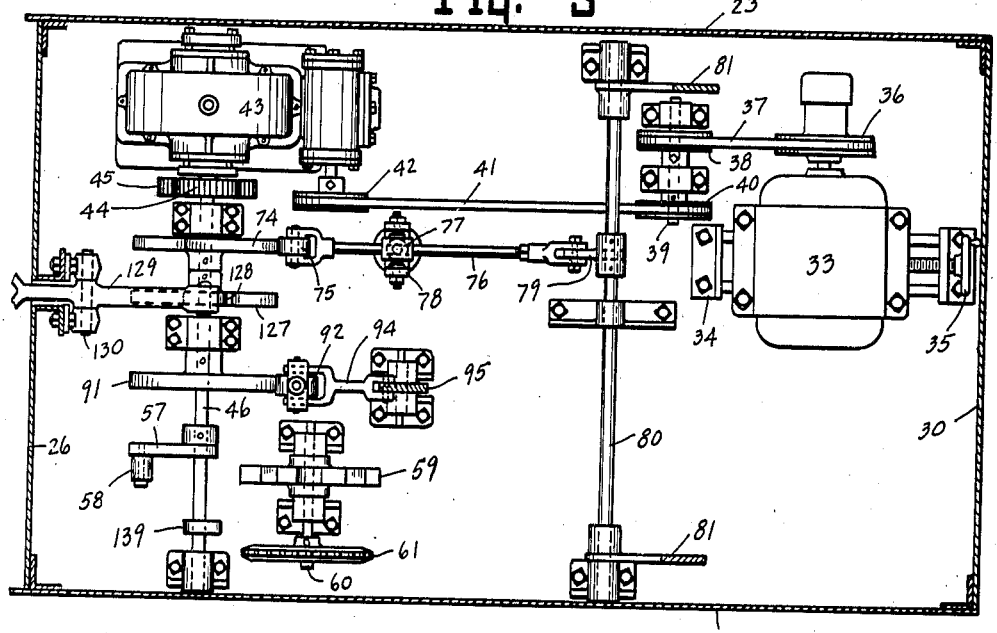
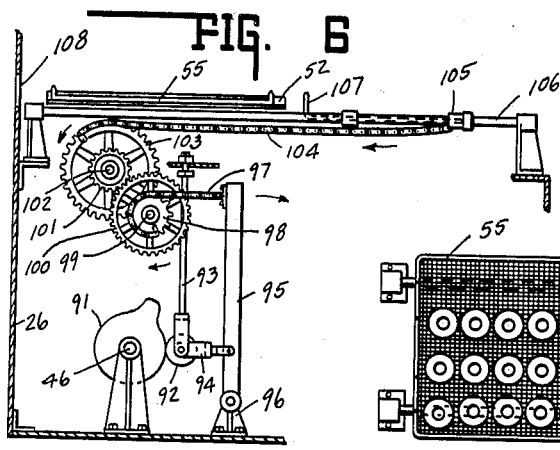
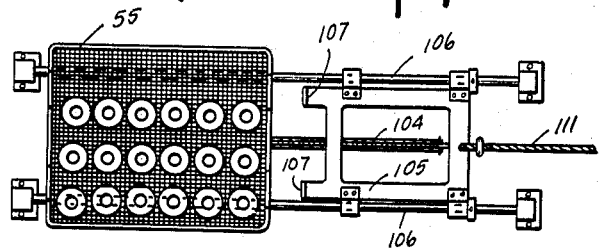
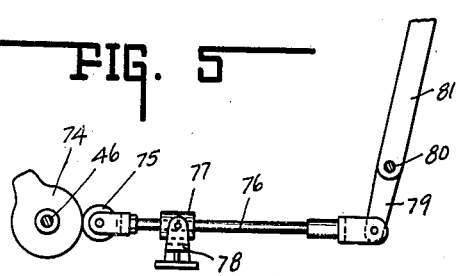
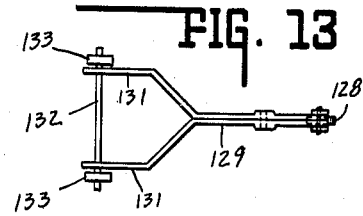
INVENTOR.
JULIUS T. RUCH.
BY Lockwood, Goldsmith & Galt.
ATTORNEYS.

Nov. 16, 1943.            J. T. RUCH            2,334,650
APPARATUS FOR DEEP FAT COOKING
Filed May 5, 1941            6 Sheets-Sheet 4
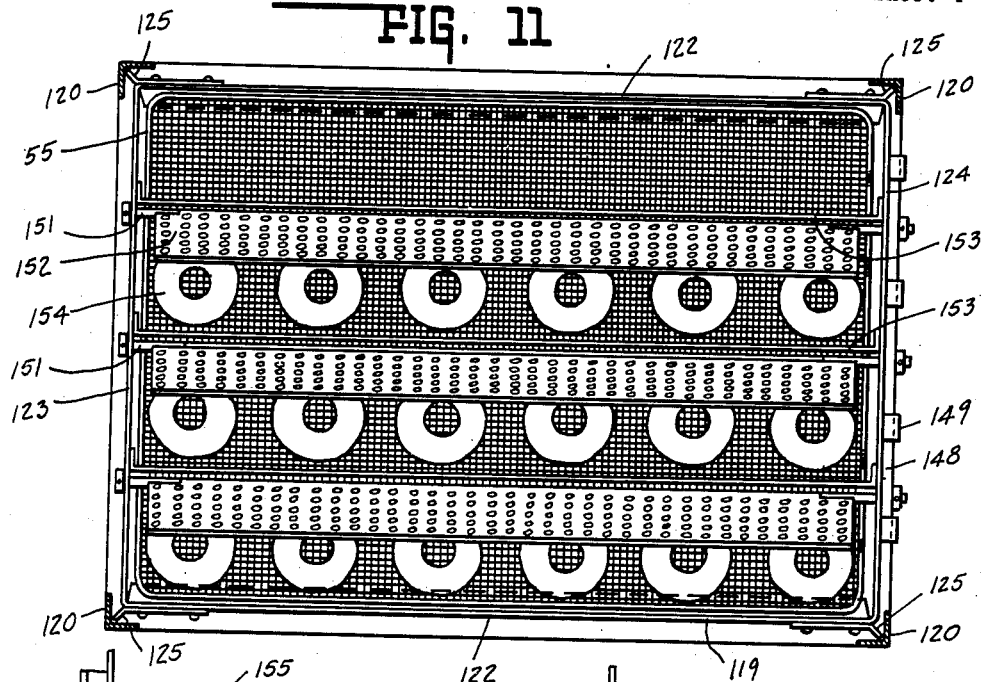
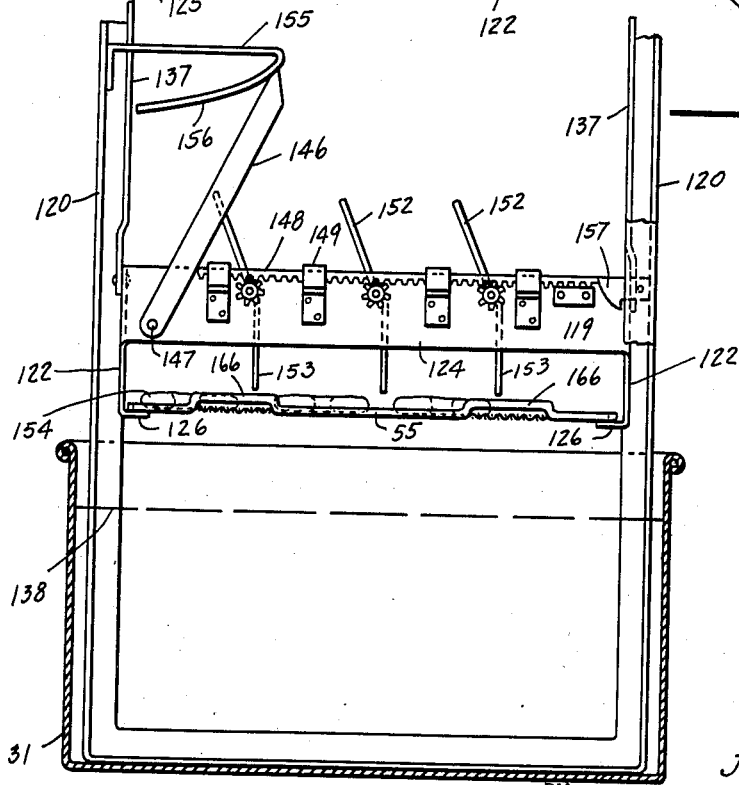
INVENTOR.
JULIUS T. RUCH.
BY Lockwood, Goldsmith & Galt.
ATTORNEYS.

Nov. 16, 1943.   J. T. RUCH   2,334,650
APPARATUS FOR DEEP FAT COOKING
Filed May 5, 1941   6 Sheets-Sheet 5

INVENTOR.
JULIUS T. RUCH.
BY Lockwood, Goldsmith & Galt
ATTORNEYS.

Nov. 16, 1943.      J. T. RUCH      2,334,650
APPARATUS FOR DEEP FAT COOKING
Filed May 5, 1941      6 Sheets-Sheet 6
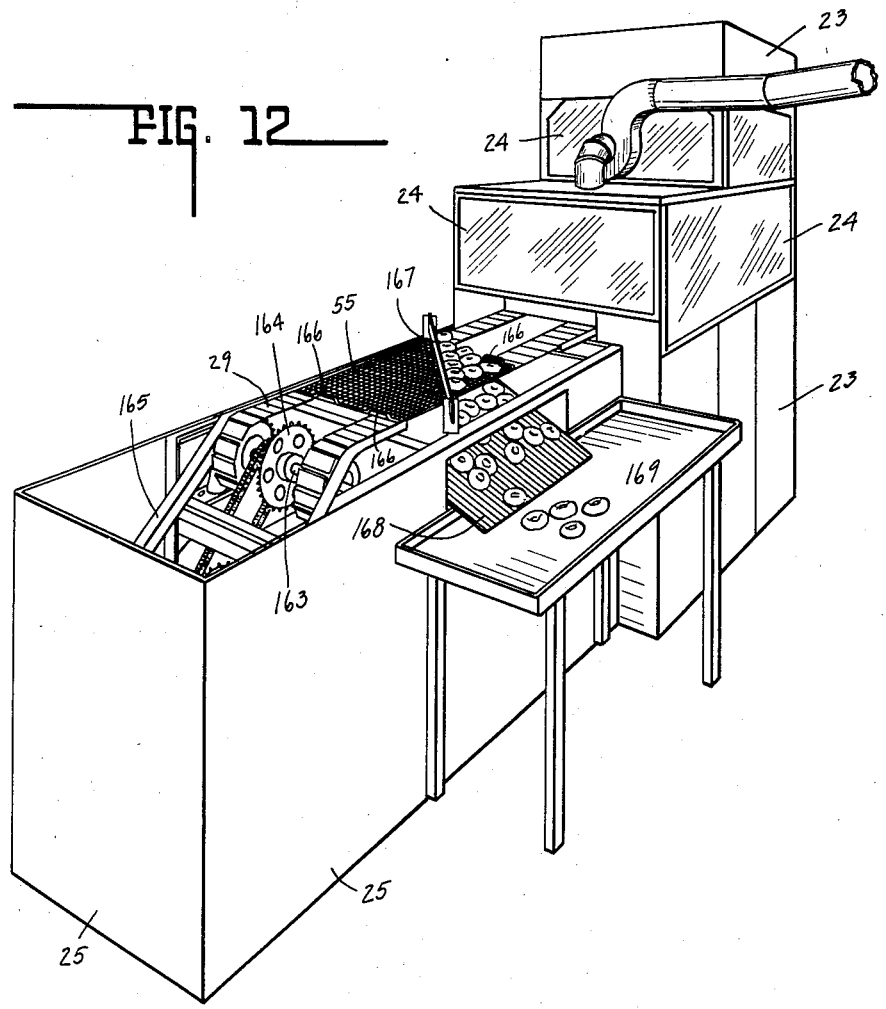
INVENTOR.
JULIUS T. RUCH.
BY Lockwood, Goldsmith & Galt,
ATTORNEYS.

Patented Nov. 16, 1943

2,334,650

UNITED STATES PATENT OFFICE 2,334,650

APPARATUS FOR DEEP FAT COOKING

Julius T. Ruch, Indianapolis, Ind., assignor to Doughnut Corporation of America, New York, N. Y., a corporation Application May 5, 1941, Serial No. 391,925

14 Claims. (Cl. 99—352)

This invention relates to apparatus for deep fat cooking which is particularly adapted to the cooking of yeast raised doughnuts and similar products but which may be used for other purposes as well. Certain portions of the apparatus disclosed herein are disclosed and claimed in my prior Patent No. 2,202,602, issued May 28, 1940.

One object of the present invention is to provide apparatus by means of which products to be cooked in deep fat may be cooked in successive batches at predetermined time intervals.

Another object of the invention is to provide apparatus by means of which the time of cooking may be controlled and may be made uniform for successive batches.

Another object of the invention is to provide apparatus in which the delivery of successive batches is automatically dependent upon the cooking time assigned to the batch and in which the lost time between the removal of one batch of finished product and the introduction of another is reduced to a minimum.

Another object of the invention is to provide apparatus by means of which the raising or "proofing" and the cooking of yeast raised products are conducted in an automatic cycle of operation in which the time of proofing and the time of cooking may be accurately and uniformly controlled.

Another object of the invention is to provide apparatus by means of which the proofing and cooking of successive batches follow each other in automatically predetermined cycles of operation.

In the preferred form of the apparatus disclosed herein there is provided a deep fat cooking kettle similar to that described in my prior patent previously mentioned. A proofing compartment is located adjacent to the kettle and means are provided for transferring batches of articles from the proofing compartment to the kettle. Said means operates automatically in timed relation with the cooking cycle. In the preferred form of apparatus, conveyor means are used without the proofing compartments to move the same in a predetermined path through said compartment and to deliver successive batches of the product to a transfer point from which they may be taken by suitable transfer mechanism to the kettle. Each batch of articles passing through the proofing compartment thus receives uniform treatment irrespective of variations in temperature which may occur in different parts of said compartment. Preferably the transfer mechanism and the conveyor mechanism within the proofing compartment are operated by a single power drive which also operates mechanism associated with the kettle for turning the product and then removing it from the kettle. By this means the operations of all parts of the apparatus occur in timed sequence although some of said operations may be intermittent. A variable speed drive is preferably interposed in the power transmission mechanism so that the timing of the operations may be varied to suit different products and different conditions. Means are also provided for varying the proofing time independently.

Figure 10:
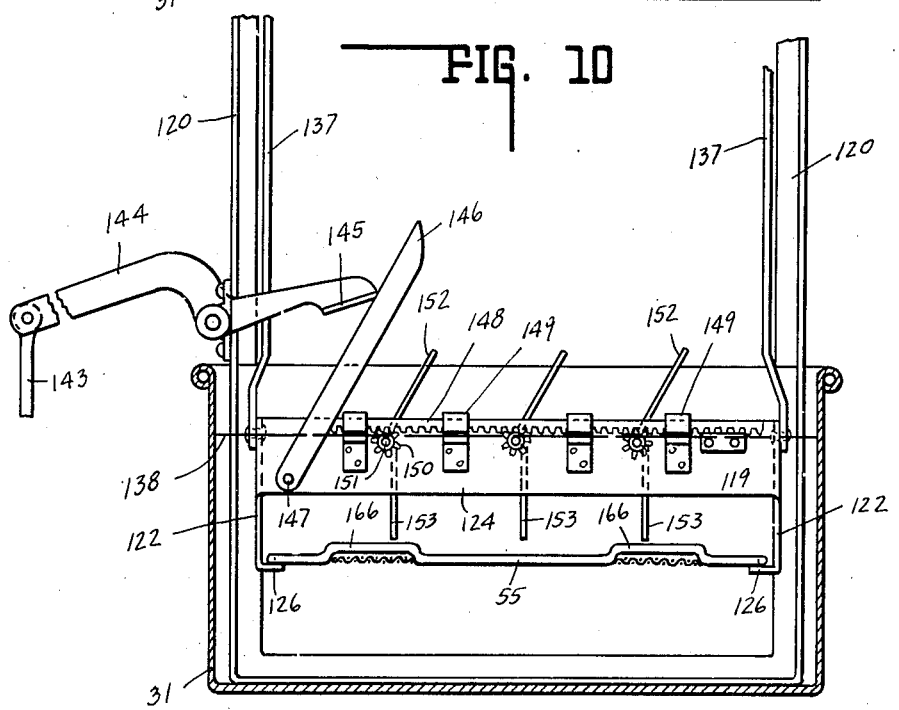

Other objects and features of the invention will be understood from the accompanying drawings and the following description and claims:

Fig. 1 is a side view of a preferred form of apparatus embodying the invention with side plates removed to show the interior mechanism in detail. Fig. 2 is a similar view of the end of the proofing compartment into which the products to be cooked are introduced. Fig. 3 is a plan view of the power transmission mechanism and associated parts. Fig. 4 is a plan view of a portion of the power transmission mechanism for operating conveyor mechanism within the proofing compartment. Fig. 5 is an elevational view of a portion of the mechanism shown in Fig. 3. Fig. 6 is a similar view of another portion of the mechanism used for transferring articles from the proofing compartment to the kettle. Fig. 7 is a plan view of the mechanism shown in Fig. 6. Fig. 8 is an elevational view of mechanism associated with the kettle and showing the kettle in section. In this figure the parts are in the position assumed when a batch of articles is received from the proofing compartment. Fig. 9 is a similar view showing the position of parts after the articles have been lowered into the kettle. Fig. 10 is a similar view showing the position of parts after the articles have been turned. Fig. 11 is a plan view of the kettle and associated mechanism with the parts in the position corresponding to that of Fig. 8. Fig. 12 is a perspective view of the complete apparatus with the side panels in place. Fig. 13 is a plan view of certain elements of the transfer mechanism.

In the preferred form of the invention shown by way of illustration in the drawings there is provided a stationary framework consisting of base members 20, vertical members 21, horizontal members 22 and other members not indicated by number. The details of the stationary framework are not important since it is apparent that the several operating parts may be supported in any manner necessary. The stationary framework is enclosed by panels 23, 24 and 25 as shown in Fig. 12. Certain of these panels such as those indicated "24" in Fig. 12, may be of glass or similar material so that the operation within the several compartments may be visible. All of the panels may be removable for inspection, cleaning and other servicing. Within the enclosure formed by said panels a partition 26 (Fig. 3) divides the apparatus into a proofing compartment and a cooking compartment. Referring to Fig. 1, the partition 26 is substantially in the plane of the vertical frame member 27, the proofing compartment being to the right of said member and the cooking compartment to the left. The cooking compartment extends to the plane of the vertical frame member 28, to the left of which there is provided an off-bearing conveyor 29. The end of the proofing compartment to the right in Fig. 1 is closed by a panel 30 (Fig. 3) which has been removed in Fig. 2 to show the interior of the proofing compartment in detail. The panel 30 is provided with suitable openings through which the product may be placed in the proofing compartment.

Within the cooking compartment there is located a deep fat cooking kettle 31 and suitable heaters such as gas burners 32 for maintaining the proper temperature therein. The proofing compartment may also be provided with suitable heaters, not shown, for maintaining a desired temperature.

Power transmission mechanism

The power transmission mechanism is preferably located in the lower part of the proofing compartment and is best shown in Fig. 3. An electric motor 33 is slidably mounted on a base 34 and may be moved to the right or left in Fig. 3 by means of a hand wheel 35. A variable pitch pulley 36 is mounted on the shaft of said motor and is connected by a belt 37 to a pulley 38 mounted on a jack shaft 39. By operation of the hand wheel 35 the pitch of the pulley 36 may be varied to change the speed of rotation of the jack shaft 39 in a well known manner. The jack shaft 39 carries a pulley 40 connected by a belt 41 with a pulley 42 mounted on the input shaft of a double reduction gear unit contained in a housing 43. The output shaft of said reduction gear unit carries a gear 44 meshing with a gear 45 carried on a cam shaft 46. Said cam shaft carries a plurality of cams by means of which the several operations of the apparatus are controlled.

Vertical conveyors in proofing compartment

Within the proofing compartment there are provided a pair of vertically movable conveyors generally indicated by the reference numbers 47 and 48 in Fig. 1. The conveyor 47 consists of vertically arranged sprocket chains 49 on which there are mounted horizontally arranged angle members 50. Two of the sprocket chains 49 with associated angle members 50 are arranged on each side of the compartment. The conveyor 48 consists of a similar set of sprocket chains 51 carrying angle members 52. The lower parts of the chains 49 are trained about sprockets 53 and their upper parts about sprockets 54 (Fig. 2). The angle members 50 on the two sides of the conveyor 47 are arranged opposite to each other as shown in Fig. 2 and each pair of said members is adapted to support a pallet 55 on which the articles to be cooked may be carried. Said pallets are preferably constructed of woven wire mounted on a suitable rigid frame as seen in Fig. 7. The conveyor 48 is similarly constructed, the upper parts of the chains 51 being trained about suitable sprockets and the lower ends being trained about sprockets 56.

Referring now to Fig. 3, the cam shaft 46 carries an arm 57 in turn carrying a roller 58 adapted to engage suitable recesses and a star wheel 59. The star wheel 59 is carried on a jack shaft 60 which also carries a sprocket 61. A sprocket chain 62 is trained about the sprocket 61 and about a sprocket 63 carried by a horizontal shaft 64 (Fig. 4). The shaft 64 carries bevel gears 65 meshing with bevel gears 66 carried on horizontal shafts 67. The sprockets 56 driving the chains 51 of conveyor 48 are mounted on the shafts 67.

The shaft 64 also carries a sprocket 68 connected by a chain 69 to a sprocket 70 carried on a cross shaft 71. The shaft 71 is connected by bevel gears 72 to a pair of shafts 73 on which the sprockets 53 driving the chains 49 of conveyor 47 are mounted.

By means of the construction just described, the roller 58 engages the star wheel 59 at each revolution of the cam shaft 46. In so doing, it moves the parts a predetermined distance for each such revolution. The directions of movement of each of the shafts and conveyor chains are shown in Fig. 4 by suitable arrows. It will be apparent that these directions are such that the conveyor 47 moves upwardly and the conveyor 48 moves downwardly. The several sprockets and gears are so proportioned that each movement of the conveyors is through a distance corresponding to the spacing of the angle members 50 and 52.

Upper transfer mechanism

Means are provided for transferring the pallets from the conveyor 47 to the conveyor 48 near the upper portion of the proofing compartment and said means may be termed the "upper transfer mechanism." The operation of said means is controlled by a cam 74 carried by the cam shaft 46 and engaging a follower 75 carried on the end of a rod 76. The rod 76 is slidably mounted in a bearing 77 which is pivotally mounted on a bracket 78. The opposite end of the rod 76 is connected to an arm 79 mounted on a cross shaft 80, at each end of which there is secured an upwardly extending arm 81. Adjacent the upper end of the proofing compartment (Fig. 2) there are provided a pair of stationary rods 82 on which there are mounted slidable members 83 having downwardly extending portions 84 adapted to engage the uppermost of the pallets 55 on the conveyor 47. The slidable members 83 are rigidly connected by a rod 85 and have extending therefrom rods 86 engaging the forked upper ends of the arms 81. By means of this construction the cam 74 operates the arms 81 once in each revolution of the cam shaft 46 and moves said arms to the left in Fig. 1. In this movement the slidable members 83 are moved along the stationary shafts 82 and the downwardly extending portions 84 of said members engage the uppermost pallets on the conveyor 47 and transfer the same to the uppermost pair of angle members 52 on the conveyor 48.

The return movement of the upper transfer mechanism is effected by means of a counterweight 87 carried by a cord 88 which is trained about suitable sprockets 89 and 90 and is secured to the bar 85. The counterweight 87 serves to return the upper transfer mechanism to normal position and to retain the follower 75 against the cam 74.

The operation of this transfer mechanism being controlled by the movement of cam shaft 46 may occur at any predetermined time in the cycle of operation when the conveyors 47 and 48 are at rest.

In the operation of the apparatus thus far described, the pallets 55 carrying articles to be proofed and cooked are manually placed on the conveyor 47 at a suitable point near the lower part of said conveyor. Said pallets are moved upwardly step by step and as each pallet reaches the top of conveyor 47 it is carried by the upper transfer mechanism to the conveyor 48 and is then moved downwardly on said conveyors step by step.

Lower transfer mechanism

As the pallets reach a transfer position adjacent the lower part of the conveyors 48, they are transferred from said conveyors to a position above the kettle 31 by mechanism which may be termed "the lower transfer mechanism."

The operation of the lower transfer mechanism is controlled by a cam 91 mounted on the cam shaft 46. Said cam is engaged by a follower 92 which is supported on a vertically extending rod 93 which is pivotally mounted at its upper end on a portion of the stationary frame of the apparatus. The follower 92 is connected by a link 94 to a lever 95 which is pivotally mounted at its lower end on a stationary bracket 96. The upper end of the lever 95 has secured thereto a sprocket chain 97, the opposite end of which is partially wrapped around and secured to a sprocket 98. Said sprocket is mounted on a shaft 99 carrying a gear 100 meshing with a gear 101 on a shaft 102. A sprocket 103 is mounted on the shaft 102 and has secured thereto one end of a sprocket chain 104. The opposite end of the chain 104 is secured to a slide 105 which is slidably mounted on a pair of stationary horizontal rods 106. The slide 105 is provided with upturned fingers 107 adapted to engage one of the pallets 55 carried by the angle members 52 of the conveyor 48. Once during each cycle of operation of the cam shaft 46, the conveyor 48 delivers a pallet 55 to the transfer position shown in Fig. 6 in which said pallet is supported slightly above the level of the rods 106. Thereafter the cam 91 operates the mechanism just described to move the slide 105 to the left in Fig. 6. The fingers 107 engage the pallet 55 and move the same through an opening 108 in the partition 26, thus transferring the same from the proofing compartment to the cooking compartment.

The slide 105 is returned to its normal position by means of a counterweight 109 (Fig. 2). Said counterweight is provided with a sheave 110 about which there is trained a cord 111 secured to the stationary frame of the machine at 112 and having its opposite end trained about a pulley 113 and secured to the slide 105. The counterweight 109 thus maintains a suitable tension on the sprocket chains 104 and 97 and keeps the follower 92 in engagement with the cam 91. In its retracted position the slide 105 is positioned within the conveyor 47 as best seen in Fig. 2. A suitable stationary guard 114 is mounted in position to prevent the placing of a pallet so as to interfere with the movement of said slide.

Mechanism for placing the product in the kettle and removing the same therefrom Within the cooking compartment there is provided a stationary framework consisting of vertical angle members 120 and horizontal members 121. Said framework extends downwardly within the kettle 31 and may be supported on the bottom of the kettle and suitably braced from the main framework of the machine. A movable carrier 119 consisting of side plates 122 and end plates 123 and 124 is suitably guided for vertical movement by means of wings 125 adapted to engage the frame members 120 as shown in Fig. 11. The lower edges of the side plates 122 are inturned to provide flanges 126 to receive the pallets 55 as they are transferred from the proofing compartment.

The carrier 119 is lowered to place the product in the kettle and is raised to remove the product therefrom by means of mechanism controlled by a cam 127 mounted on the cam shaft 46. Said cam is engaged by a follower 128 carried on the end of a yoke lever 129 which is pivotally mounted at 130 and extends through a suitable opening in the partition 26 to a point beneath the cooking compartment. The yoke lever 129 is shaped as best seen in Fig. 13 and the forked outer ends 131 carry a horizontal bar 132 each end of which carries a block 133. Each of the blocks 133 has pivotally secured thereto a pair of upwardly extending rods 134, the upper ends of which are pivotally secured to levers 135 in turn pivotally mounted on hangers 136 secured to the horizontal frame members 121. Links 137 connect the outer ends of the levers 135 to the side plates 122 of the carrier 119.

By means of the mechanism just described the cam 127 permits the carrier 119 carrying a pallet 55 to be lowered into the kettle 31 by gravity at a predetermined time in the rotation of cam shaft 46. The kettle 31 is normally filled with melted fat to a level indicated by the broken line 138 in Figs. 8, 9 and 10. As the pallet 55 sinks beneath the surface of the fat, the doughnuts or other articles carried thereby float to the surface in the usual manner. At a later time in the rotation of cam shaft 46 the cam 127 operates to lift the pallet carrier 119 to recapture the articles and remove the same from the kettle.

Turning mechanism

For turning the articles during cooking there is provided mechanism controlled by a cam 139 on the cam shaft 46. Said cam is engaged by a follower 140 carried by a lever 141 which is link-connected to a second lever 142 to form a compound linkage (Fig. 1). A rod 143 is pivotally connected to the lever 141 and to a lever 144 which is pivotally mounted on one of the frame members 120. The lever 144 has an inturned flange 145 (Figs. 9 and 10) adapted to engage the upper end of a lever 146 pivotally mounted at 147 on the end plate 124 of the carrier 119. A rack 148 is guided by guide members 149 on the plate 124 and the end of said rack is engaged by the lever 146. The rack 148 meshes with pinions 150 carried by longitudinal shafts 151 which are journaled in the plates 123 and 124. Each of said shafts has secured thereto a perforated turning blade 152. Adjacent each of the turning blades 152 there is provided a partition 153 secured to the end plates 123 and 124. In the structure disclosed in the drawings, three of said partitions and three turning blades are provided.

The doughnuts 154 are placed on the pallets as best seen in Fig. 11 with three rows of doughnuts aligned with the channels formed by the three partition plates 153 and the side plate 122 at the bottom of Fig. 11. The space beneath the upper channel of Fig. 11 is left vacant. When the carrier 119 is in its upper position as shown in Fig. 8, the turning blades 152 are in the position shown in that figure and the weight of said blades urges the rack 148 against the lever 146. The upper end of said lever is engaged by a guide member 155 which holds the parts in the position shown. As the carrier 119 is lowered into the kettle 31 the upper end of lever 146 follows the curved lower portion 156 of the guide member 155 and permits the turning blades 152 to be gently lowered into position against the partition plates 153.

When the carrier has been fully lowered into the kettle the parts assume the position shown in Fig. 9 with the doughnuts floating on the surface of the fat. At a suitable time thereafter the cam 139 operates its associated linkage to lift the lever 144 as shown in Fig. 10 and to press the same against the lever 146. In this movement the turning blades 152 engage the undersurfaces of the doughnuts 154, lift the same over the partitions 153 and deposit each row of doughnuts in the adjacent channel in a reversed position.

At the end of this movement the blades 152 assume the position shown in Fig. 10 and remain in that position with the right-hand end of the rack 148 against a suitable stop throughout the remainder of the cooking period. When the pallet 55 is lifted from the kettle to recapture the doughnuts the right-hand end of the rack 148 strikes a guide member 157 secured to one of the frame members 120 and is moved thereby to return the parts to the position of Fig. 8.

Off-bearing mechanism

The off-bearing conveyor 29 may be driven by the motor 33 or by a separate motor as desired. In the drawings a separate motor 158 is shown arranged for driving said conveyor by means of a belt 159 driving a jack shaft 160 connected by a sprocket chain 161 to the drive shaft 162 of said conveyor. The conveyor 29 is preferably of the platform chain type as best shown in Fig. 12. The tail shaft 163 thereof carries a sprocket 164 adapted to engage the meshes of the pallets 55 and to lower the same gently down a guideway 165 to a suitable receptacle or return conveyor.

The pallets 55 are provided with upturned portions 166 formed on the rims thereof so that they have sufficient effective thickness to prevent one pallet from over-riding the next. As each pallet is moved from the proofing compartment to the flanges 126 of the carrier 119 it engages the preceding pallet which has just been removed from the kettle and pushes the same from the flanges 126 to the off-bearing conveyor 129. When the outgoing pallet is sufficiently engaged by the conveyor 129, it is drawn completely out of the cooking compartment through a suitable opening in the end panel thereof. The pallet then passes beneath a sweeping blade 167 which is set at an acute angle across the path of the doughnuts and which sweeps the finished product from the pallet to a chute 168 leading to an accumulating table 169.

Résumé of operation

In the operation of the apparatus, the dough is cut or formed into the desired shape by hand or by suitable machinery if desired and the individual articles are placed on the pallet arranged as shown in Fig. 11. At intervals corresponding to the length of the cycles of operation of the apparatus a pallet is placed on the conveyor 47. The conveyor 47 lifts the pallets step by step to the top of the proofing compartment where they are transferred to the conveyor 48 by the upper transfer mechanism. On the conveyor 48 the articles are lowered step by step until they reach the transfer position shown in Fig. 6. The pallets thus follow a predetermined path through the proofing compartment. The length of this path and the speed of movement of the conveyors are properly proportioned so that the dough will be raised or proofed while moving in said path. The pallets are delivered to the transfer station at intervals of time corresponding to one revolution of the cam shaft 46 and as long as the pallets are placed in the proofing compartment at similar intervals of time the articles on each pallet receive exactly the same treatment.

As soon as the pallet has reached the transfer station, the lower transfer mechanism shown in Figs. 6 and 7 operates to move the pallet from the proofing compartment to the cooking compartment and to place the same on the flanges 126 of the carrier 119 which at that time is in the upper position shown in Fig. 8. Immediately thereafter the pallet is lowered into the kettle 31 by operation of the cam 127. At a predetermined time after the pallet has been lowered, the product is turned by operation of cam 139 and after a similar period of time cam 127 operates to lift the pallet from the kettle. At or before the latter event another pallet has reached the transfer station and is then moved into the cooking compartment displacing the pallet already therein and moving the same on to the off-bearing conveyor 29. On said conveyor the articles are removed from the pallet by means of the blade 167 and are transferred to the table 169.

In this cycle of operation the several events take place in timed sequence, depending upon the position and shape of the cams on the shaft 46. The period during which articles are transferred to and from the cooking compartment is made as small as possible and the cooking time largely determines the time length of a cycle. The cooking time is determined by the particular product and the nature of the mix from which it is made and may be varied to suit particular conditions by means of the variable speed drive between the motor 33 and the cam shaft 46. A change in the speed of the cam shaft by manipulation of the variable speed drive necessarily changes the frequency with which pallets are delivered to the transfer station but does not necessarily control the time during which each pallet remains in the proofing compartment. The proofing time is controlled by the position in which the pallets are first placed on the conveyor 47. If a maximum proofing time is required, the pallets are placed on the angle members 50 immediately above the stationary guard member 114. Pallets so placed travel through a maximum path in the proofing compartment and thus have the maximum proofing time for any given length of cycle. If shorter proofing periods are desired, the pallets are initially placed at higher points on the conveyor 47 and the proofing period is correspondingly shortened.

The invention has been described in one of its preferred forms, the details of which may be varied between wide limits without departing from the scope of the invention as defined in the appended claims.

The invention claimed is:

1. In apparatus for deep fat cooking of yeast raised products, a proofing compartment, a deep fat cooking kettle, a carrying device adapted to receive pallets carrying articles to be cooked, mechanism adapted to move said carrying device to lower said pallets into said kettle for cooking said articles and to lift the same therefrom after the lapse of a predetermined cooking period, and conveying means operating in timed relation with the operation of said mechanism and adapted to move pallets from said proofing compartment to said carrying device.

2. In apparatus for deep fat cooking of yeast raised products, a proofing compartment, a deep fat cooking kettle, means in said proofing compartment adapted to support pallets carrying articles to be cooked, and transfer mechanism adapted to remove a pallet from said supporting means and transfer the same to said kettle for cooking the articles carried thereby, said transfer mechanism being automatically operated to transfer pallets successively at predetermined time intervals.

3. In apparatus for deep fat cooking of yeast raised products, a proofing compartment, a deep fat cooking kettle, means in said proofing compartment adapted to support pallets carrying articles to be cooked, transfer mechanism adapted to remove a pallet from said supporting means and transfer the same to said kettle for cooking the articles carried thereby, said transfer mechanism being automatically operated to transfer pallets successively at predetermined time intervals, and a variable speed power drive operating said transfer mechanism, by variation of the speed of which the duration of said time intervals may be controlled.

4. In apparatus for deep fat cooking of yeast raised products, a proofing compartment, a deep fat cooking kettle, means in said proofing compartment adapted to support pallets carrying articles to be cooked, and transfer mechanism adapted to remove a pallet from said supporting means and transfer the same to said kettle for cooking the articles carried thereby, said transfer mechanism being automatically and intermittently operated to transfer pallets successively at predetermined time intervals.

5. In apparatus for deep fat cooking of yeast raised products, a proofing compartment, a deep fat cooking kettle, movable means adapted to move a plurality of article carrying pallets in a predetermined path in said proofing compartment and to bring the same to a transfer station successively and at predetermined time intervals, and transfer mechanism operating in timed relation with the operation of said movable means and adapted to transfer pallets from said transfer station to said kettle for cooking the articles carried thereby.

6. In apparatus for deep fat cooking of yeast raised products, a proofing compartment, a deep fat cooking kettle, movable means adapted to move a plurality of article carrying pallets in a predetermined path in said proofing compartment and to bring the same to a transfer station successively and at predetermined time intervals, transfer mechanism operating in timed relation with the operation of said movable means and adapted to transfer pallets from said transfer station to said kettle for cooking the articles carried thereby, and a variable speed power drive operating said movable means and said transfer mechanism, by variation of the speed of which the length of said time intervals may be controlled.

7. In apparatus for deep fat cooking of yeast raised products, a proofing compartment, a deep fat cooking kettle, a carrying device adapted to receive pallets carrying articles to be cooked, mechanism adapted to move said carrying device to lower said pallets into said kettle for cooking said articles and to lift the same therefrom after the lapse of a predetermined cooking period, movable means adapted to move a plurality of article carrying pallets in a predetermined path in said proofing compartment and to bring the same to a transfer station successively and at predetermined time intervals, and conveyor means operable to transfer pallets from said transfer point to said carrying device.

8. In apparatus for deep fat cooking of yeast raised products, a proofing compartment, a deep fat cooking kettle, a carrying device adapted to receive pallets carrying articles to be cooked, mechanism adapted to move said carrying device to lower said pallets into said kettle for cooking said articles and to lift the same therefrom after the lapse of a predetermined cooking period, movable means adapted to move a plurality of article carrying pallets in a predetermined path in said proofing compartment and to bring the same to a transfer station successively and at predetermined time intervals, conveyor means operable to transfer pallets from said transfer point to said carrying device, and a single power drive operating said carrying device, said movable means and said conveyor means, whereby timed relation between their operations is maintained.

9. In apparatus for deep fat cooking of yeast raised products, a proofing compartment, a deep fat cooking kettle, movable means adapted to move a plurality of article carrying pallets at a predetermined speed from a receiving station through a predetermined path in said proofing compartment and to deliver said pallets successively to a transfer station, and transfer mechanism operating in timed relation with the operation of said movable means and adapted to transfer pallets from said transfer station to said kettle for cooking the articles carried thereby.

10. In apparatus for deep fat cooking of yeast raised products, a proofing compartment, a pair of vertically movable conveyors in said proofing compartment, one of said conveyors being adapted to receive pallets carrying articles to be cooked and to move the same upwardly from a receiving station, and the other of said conveyors being adapted to move said pallets downwardly to a transfer station, and transfer mechanism adapted to transfer said pallets from the first of said conveyors to the second in the upper portion of said proofing compartment.

11. In apparatus for deep fat cooking of yeast raised products, a proofing compartment, a pair of vertically movable conveyors in said proofing compartment, one of said conveyors being adapted to receive pallets carrying articles to be cooked and to move the same upwardly from a receiving station, and the other of said conveyors being adapted to move said pallets downwardly to a transfer station, transfer mechanism adapted to transfer said pallets from the first of said conveyors to the second in the upper portion of said proofing compartment, and other transfer mechanism adapted to move said pallets from said transfer station to a point outside of said proofing compartment.

12. In apparatus for deep fat cooking of yeast raised products, a proofing compartment, a pair of vertically movable conveyors in said proofing compartment, one of said conveyors being adapted to receive pallets carrying articles to be cooked and to move the same upwardly from a receiving station, and the other of said conveyors being adapted to move said pallets downwardly to a transfer station, transfer mechanism adapted to transfer said pallets from the first of said conveyors to the second in the upper portion of said proofing compartment, a deep fat cooking kettle, and conveying means adapted to move said pallets from said transfer station to said kettle for cooking the articles carried thereby.

13. In apparatus for deep fat cooking, a deep fat cooking kettle, a carrying device adapted to receive pallets carrying the articles to be cooked, mechanism adapted to move said carrying device vertically to lower the pallet carried thereby downwardly into said kettle for cooking said articles and lift said pallet upwardly therefrom after the lapse of a predetermined cooking period, and conveying means movable in timed relation to the operation of said mechanism operable exteriorly of said kettle to transfer said pallets to said carrying device.

14. In apparatus for deep fat cooking, a deep fat cooking kettle, a movable conveyor on the intake side of said kettle, a movable conveyor on the out-put side of said kettle, said conveyors being operable exteriorly thereof, means for driving said conveyors, a carrying device intermediate said conveyors adapted to receive pallets carrying the articles to be cooked, mechanism adapted to move said carrying device vertically to lower said pallets downwardly into said kettle for cooking said articles and lift the same upwardly therefrom after a lapse of a predetermined cooking period, means for transferring said pallets from the first-mentioned conveyor to said carrying device, and means for operating said transfer means in timed relation therewith, said second-mentioned conveyor being operable to receive and convey from said kettle the pallet lifted therefrom after the cooking period.

JULIUS T. RUCH.